May 29, 1945.

G. BROWN

Re. 22,645

VACUUM BREAKER

Original Filed July 24, 1941

INVENTOR

Gregory Brown

BY

Kenyon & Kenyon

ATTORNEYS

Reissued May 29, 1945

Re. 22,645

UNITED STATES PATENT OFFICE 22,645

VACUUM BREAKER

Gregory Brown, Bridgeport, Conn., assignor to Bridgeport Brass Company, Bridgeport, Conn., a corporation of Connecticut Original No. 2,277,295, dated March 24, 1942, Serial No. 403,795, July 24, 1941. Application for reissue August 31, 1944, Serial No. 552,111

24 Claims. (Cl. 137—69)

This invention relates to vacuum breakers and more especially to devices for breaking the vacuum, which exists in the flushing system of a toilet fixture or the like between the fixture and the flush valve that controls the flow of flushing water thereto. Unless there is provision for breaking the vacuum above referred to, water may be drawn from the device being flushed into the water supply system. Therefore, in many localities, it is mandatory that newly installed flush valves be equipped with vacuum breakers.

Some of the vacuum breakers now in use are embodied in the outlet tail-piece of the flush valve and while they have been satisfactory with respect to the feature of destroying the objectionable vacuum, they are subject to the objection of being noisy. In the typical vacuum breaker structure, the flush valve tail-piece is provided with a vent which is adapted to be closed during the flushing operation by a closure actuated by the water flowing through the tail-piece to the device to be flushed, the arrangement being such that, upon cessation of water flow, the closure is removed from the vent, thereby allowing air to flow into the tail-piece to destroy whatever vacuum may exist in the flushing system. One requirement of the building codes in the communities requiring the use of vacuum breakers is that the closure be removed from the vent by gravity and that the vacuum breaker be free of springs.

The flow of water through the flushing system tends to produce a partial vacuum therein and, unless the vent is closed with an air-tight seal, air will flow into the tail-piece with considerable resulting noise. The structure of some of the vacuum breakers now on the market is such that the vent is tightly closed only during the period of maximum water flow, and the vent is gradually opened beginning at a time considerably prior to cessation of water flow, so that over a considerable period a slight opening exists through which air is drawn into the tail-piece with resulting noise during such period or until the vent is open to a considerable extent.

An object of this invention is to provide a small and compact gravity-operated vacuum breaker of simple and sturdy construction, low manufacturing cost, and having such arrangement of parts that the vent is retained in tightly closed condition until the flow of flushing water has substantially ceased, thus reducing the noise to a minimum. It may be constructed separately or as part of the flush valve construction. When installed it forms part of the flush valve.

Further objects of this invention include the provision of a vacuum breaker which has a pivotally mounted closure for the flushing system normally positioned to prevent back flow of water therethrough, said closure being moved to inoperative or open position by the force of the flow of flushing water, the vacuum breaker having a separate vent closure pivotally mounted so as to be forced by gravity to an inoperative or open position, the vent closure being engaged and moved or actuated to its operative or closing position by the movement of the first-mentioned closure to its open or inoperative position, whereby the vent closure is held in closed position throughout the flow of flushing water. When the flow of water ceases, the vent closure moves by the force of gravity to its open or inoperative position and engages and forces or moves the first-mentioned closure to its operative position to close the flushing system. However, while the two closures actuate or move each other, they are independently mounted in such a manner that, when in closing or operative position, each closure tightly and effectively closes its opening.

In one embodiment of the vacuum breaker of this invention, the tail-piece of the flushing valve is formed with an inner conduit having its outlet arranged to effect discharge of water therefrom transversely of the tail-piece in the general direction of the vent. A vent closure and a conduit closure are swingably supported by a common pivot pin and the vent closure is suitably weighted to bias it out of operative position. The conduit closure is interposed between the vent closure and the conduit outlet in such manner that it is engaged and pushed into operative position by the vent closure when the latter moves into inoperative position. The conduit closure is actuated by the discharge of water from the conduit outlet and engages and swings the vent closure into operative or closing position and holds it in such position as long as water flows through the conduit. The conduit closure is also provided with an oblique peripheral flange engageable by water flowing longitudinally through the tail-piece to urge the conduit closure away from the conduit outlet.

Other objects, novel features and advantages of this invention will become apparent from the following specification and accompanying drawing, wherein.

Figure 1:
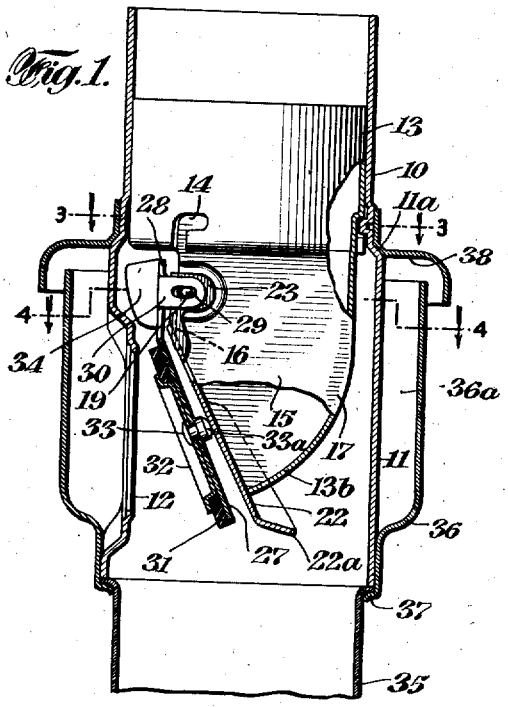
Fig. 1 is a longitudinal section through a flush valve tail-piece equipped with a vacuum breaker embodying the invention.
Figure 2:
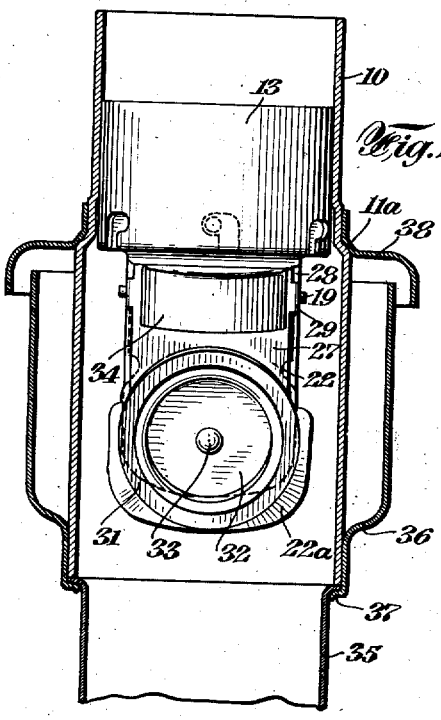
Fig. 2 is a similar section taken at right angles to Fig. 1.
Figure 3:
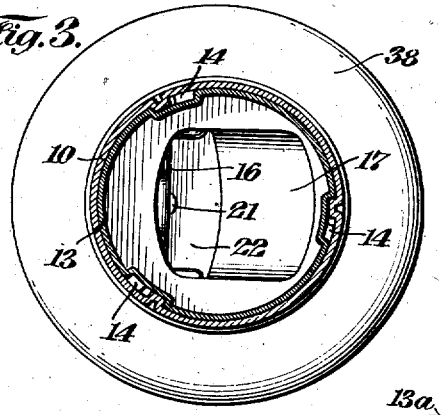
Fig. 3 is a section on the line 3—3 of Fig. 1.
Figure 4:
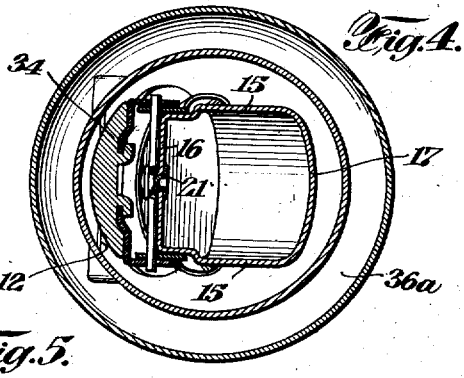
Fig. 4 is a section on the line 4—4 of Fig. 1.

In the construction shown in the drawing, the tubular tail-piece 10 of a flushing valve has a lower tubular portion 11 of slightly larger diameter than the remainder, resulting in the formation of an external shoulder 11a. The enlarged portion 11 of the tail-piece is provided with a vent opening or aperture 12 formed by depressing a circular portion of the wall thereof and stamping or cutting out a circular section. The tail-piece preferably is formed of seamless tubing and the vent or aperture 12 is formed by the use of tools commonly used to produce an aperture having an inwardly projecting coined or perfectly flat edge (Fig. 1). A tubular conduit or sleeve 13 is supported within the tail-piece 10 by means of bayonet and slot joints 14. The upper edge portion 13a of the conduit 13 is preferably made slightly out of round or eccentric so that when conduit or sleeve 13 is in place it engages the inner surface of the upper portion of the tail-piece with sufficient friction to prevent disengagement of the bayonet joints.

The lower portion 13b of sleeve or conduit 13 is of less overall diameter than its upper portion and it extends downwardly within the larger portion 11 of the tail-piece, and, of course, is less in diameter than said larger portion. This lower portion 13b is shaped in the form of a curved or deflected spout having two opposed substantially flat side walls or faces 15 connected and defined at one end by a relatively short and substantially flat face wall or face 16 and at the other end by the substantially longer and curved or arcuate wall or face 17. The lower end of the conduit 13 is, therefore provided with a discharge opening 13c lying in a plane oblique to the longitudinal axis of the tail-piece and facing or opposing the vent 12.

Figure 5:
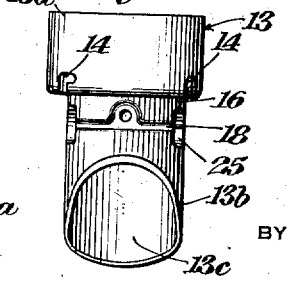
Fig. 5 is an elevation of one element of the vacuum breaker.
Figure 6:
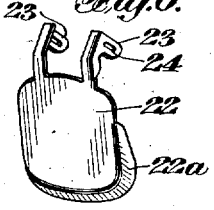
Figure 8:
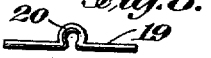
Fig. 8 is an elevation of still another element.

The flat wall or face 16 is provided with a depression 18 (Fig. 5) of suitable configuration to receive a pin 19 having a central loop or eye 20 (Fig. 8). The pin 19 is held in the recess 18 by a rivet 21 which passes through the wall 16 and the loop or eye 20. A conduit closure 22 (Figure 6) is provided with oblique arms extending upwardly from the body and terminating in outstanding lugs 23 provided with slots 24 to receive the ends of the pin 19 to support the closure 22 both for swinging movement about the pin 19 and for movement relative thereto. This construction permits closure 22 to fit and adust itself tightly upon the end of the outlet of conduit 13. The closure 22 is provided with a flange 22a which projects obliquely from the rim of the lower portion thereof and which corresponds to and overlies the entire end edge of wall 17 and a substantial part of the end edges of walls 15. Each wall 15 is provided with recesses 25 to receive the lugs 23. The lugs 23 are offset from the plane of the main portion of the closure 22 in such manner that the closure 22 lies flat against the end edge of the conduit outlet with the pin 19 arranged centrally of the slots 24.

Figure 7:
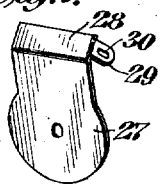
Fig. 6 and Fig. 7 are perspective views of elements.

A closure for the vent opening 12 consists of a flat disc-like plate 27 (Fig. 7) of the proper size and having an upper portion 28 extending obliquely to the remainder of the plate. This portion 28 is provided with outstanding lugs 29 at each end having elongated slots 30 to receive the ends of the pin 19. When in assembled position plate 27 overlies closure 22 and the lugs 29 overlie the lugs 23. An annular gasket 31 of rubber or other suitable sealing material is attached to the plate 27 through the medium of flanged disc 32 fastened to the plate 27 by a rivet 33, the right-hand end or head 33a of the rivet being rounded and extended sufficiently to engage the face of closure 22, and having a universal bearing thereagainst. A weight member 34 is attached to the portion 28 of the plate 27 and biases or normally tends to move the plate 27 toward the closure 22 to move the latter into engagement with the outlet end of the conduit 13. The plate 27 is thus supported by and on the pin 19 both for rotary movement about the pin and for sliding movement relative to the pin due to the length of slots 30 in lugs 29, thereby permitting plate 27 and its attached gasket to adjust and fit itself tightly upon the edge of vent opening 12 and to close the same.

A tubular extension 35 with an outwardly flared upper end abuts against the lower end of the tail-piece 10 and forms a continuation thereof. Extension 35 is held in place by a tubular member 36 having a lower portion tightly fitting and soldered to the lower end of portion 11 of the tail-piece 10 and an inwardly directed flange 37 engaging the outwardly flared end of the extension 35. The main part of the tubular member 36 is of substantially greater diameter than the portion 11 of the tail-piece and extends around the same and up to a plane above the vent opening 12, and thus a chamber 36a is provided on the outside of the lower part 11 of tail-piece 10. A cap or cover 38 is carried by the upper portion of the tail-piece 10 and rests upon and is supported by the shoulder 11a, the cap being of greater diameter than the tubular member 36 and having a downturned flange to overlie the upper edge thereof, in spaced relation thereto. Thus, the chamber 36a is always in communication with the atmosphere.

Figures 1 to 4 inclusive of the drawing show the arrangement of parts when there is no water flowing through the vacuum breaker. Under such conditions, the closure 22 is held in contact with the outlet or discharge end of the conduit or sleeve 13 because the plate 27 is biased or forced into such position by the weight 34 and the vent 12 is therefore open. Flow of water through the tail-piece and conduit causes pressure to be applied to the closure 22 to swing it, together with the plate 27, clockwise to seat the gasket 31 on the rim of the vent opening 12, thereby preventing escape of water through the vent. The direction of flow of the main portion of the stream is such as to force the closure 22 away from the outlet of conduit 13 and such action of the water is supplemented by the reaction between downwardly flowing water and the flange 22a of the closure 22. In swinging to open position the closure 22 engages the head 33a on the plate 27 to move said plate to seat the gasket 31 and upon the plate 27 coming to rest, the closure 22 rocks on the head 33a to bring the left ends of the slots 24 into engagement with pin 19, thereby constituting the closure a second class lever by which approximately double the force of the water acting against the flange 22a is applied to the plate 27 through the head 33a to maintain the gasket 31 seated. The gasket 31 produces an air-tight seal for the vent opening 12 due to the planular surface of the edge of the vent opening and also due to the fact that the plate 27 is self-adjusting by reason of its loose pivotal mounting. The plate 27 and gasket 31 are maintained in operative position, that is, in vent-closing position, until flow of water through the condut has practically ceased, because the action of the transversely flowing water in combination with the reaction effect of the lip 22a is sufficient to overcome the biasing effect of the weight 34 even with a comparatively slight flow of water. When the closure 27 starts to unseat, it unseats quickly, thereby minimizing the noise or whistle resulting from the inrush of air through a slight opening under the influence of vacuum existing within the tail-piece. The unseating of the closure 27 breaks any vacuum that may exist in the tail-piece, thereby preventing any rearward liquid flow through the tail-piece.

The pin and slot connection for the two closures permits arrangement of the pivot pin nearer the axis of the tail-piece than would otherwise be the case, thereby reducing to a minimum the necessary diameter of the tail-piece portion 11. Also, the pin and slot arrangement permits accurate seating of both the closure 22 and the gasket 31 since a certain amount of self-adjustment is permitted. The arrangement of the pivot pin also provides sufficient clearance for the weight 34 that it may be wholly contained within the tail-piece rather than project through the vent, as is the case with previous devices.

It is to be noted that the inside head 33a of the rivet 33 is of substantial size and rounded and, therefore, provides a universal bearing or joint with which the flat plate 22 engages. This plate 22 is the conduit closure and this universal bearing is within the confines of the peripheral edge of the flat plate 27 which provides the closure for the vent opening 12. This universal bearing construction permits sufficient latitude of movement so that efficient and secure seating of the parts is always accomplished.

While this invention has been described as being mounted in the tail-piece, it is to be understood that it can be readily adapted to or built as an integral part of the flush valve construction with the extension 35 serving as a tail-piece.

I claim:

1. A device of the character described, including, in combination, a flushing valve construction having a vent opening, a conduit in said construction terminating in an outlet directed toward said vent opening, a pivotally supported conduit closure, a vent closure pivotally supported independently of said conduit closure, common pivot means for pivotally supporting both said closures independently and gravity-actuated means tending to swing said vent closure out of operative or closing position, and said conduit closure into operative or closing position.

2. In the combination according to claim 1, said vent opening characterized by having its edge terminating in a planular surface within said valve construction.

3. A device of the character described, including, in combination, a flushing valve construction having a vent opening, a conduit in said valve terminating in an outlet, a conduit closure, a vent closure, separate extensions for each of said closures, said extensions each having a slot, a pivot pin supported by said conduit and passing through all of said slots, and gravity-actuated means tending to swing said vent closure out of operative position and said conduit closure into operative position.

4. In the combination according to claim 1, said conduit closure characterized by a flange projecting obliquely and outwardly from a portion of its periphery.

5. In the combination according to claim 3, said vent opening characterized by having its edge terminating in a planular surface within said valve construction.

6. In the combination according to claim 3, said conduit closure characterized by a flange projecting obliquely and outwardly from a portion of its periphery.

7. In the combination according to claim 1, said vent opening characterized by having its edge terminating in a planular surface within said valve construction and said conduit closure characterized by a flange projecting obliquely and outwardly from a portion of its periphery.

8. In the combination according to claim 3, said vent opening characterized by having its edge terminating in a planular surface within said valve construction and said conduit closure characterized by a flange projecting obliquely and outwardly from a portion of its periphery.

9. A device of the character described, including, in combination, a flushing valve tail-piece having a vent opening, a conduit in said tail-piece terminating in an outlet oblique to the tail-piece axis and facing said vent opening, a conduit closure, a vent closure, separate extensions for each of said closures angularly related to said closures, said extensions each having a slot, common pivot means supported on said conduit and arranged in all of said slots to support said two closures from a common axis of rotation, and a weight mounted on said vent closure tending to swing said vent closure into engagement with said conduit closure to move said vent closure out of operative or closing position and said conduit closure into operative or closing position.

10. In the combination according to claim 9, said vent opening characterized by having its edge terminating in a planular surface within said tail-piece.

11. In the combination according to claim 9, said conduit closure characterized by a flange projecting obliquely and outwardly from a portion of its periphery.

12. In the combination according to claim 9, said vent closure characterized by having the weight mounted thereon wholly contained within said tail-piece.

13. A device of the character described, including, in combination, a flushing valve tail-piece having a vent opening, the edge of which terminates in a planular surface within said tail-piece, a conduit in said tail-piece terminating in an outlet opening obliquely to the tail-piece axis and facing said vent, a conduit closure, a vent closure, separate extensions for each of said closures angularly related to said closures, said extensions each having a slot, common pivot means supported on said conduit and arranged in all of said slots to support said two closures from a common axis of rotation, an annulus of resilient material forming a part of the vent closure and being arranged to engage the edge of the vent opening, and a weight mounted on said vent closure tending to swing said vent closure into engagement with said conduit closure to move said vent closure out of operative or closing position and said conduit closure into operative or closing position.

14. In the combination according to claim 13, said conduit closure characterized by a flange projecting obliquely and outwardly from a portion of its periphery.

15. A device of the character described for use with a flushing valve construction, including, in combination, an element having a vent opening in communication with the atmosphere, a conduit in said element having a discharge opening directed toward said vent opening, a closure member for the discharge opening of said conduit and a closure member for said vent opening, pivot means upon which said closures are independently mounted for swinging movement, each closure also having slidable movement with respect to said pivot means, one of said closures being provided with a weight, and said closures having portions in contact with each other whereby the closures will be moved by gravity from one position to another when the flow of fluid through the conduit ceases.

16. A device of the character described for use with a flushing valve construction, including, in combination, an element having a vent opening in communication with the atmosphere, a conduit in said element having a discharge opening directed toward said vent opening, a closure member for each of said openings, said closures being independently mounted for swinging movement upon the same pivot means and so mounted as to have slidable movement with respect to said pivot means, said vent closure being provided with a weight tending to move said closure from one position to another, said closures having portions in contact with each other whereby when fluid passes through the conduit it will force the conduit closure off its seat and the vent opening closure on its seat, and when the flow of fluid ceases the weight will cause the vent closure to move from its seat and force the conduit closure against its seat.

17. A device of the character described, including in combination, a flushing valve tail-piece having a vent opening in communication with the atmosphere, a conduit in said tail-piece having a discharge opening directed toward said vent opening, a closure member for the discharge opening of said conduit and a closure member for said vent opening, said closures being independently mounted for swinging movement upon the same pivot means and so mounted as to have slidable movement with respect to said pivot means, said vent closure member being provided with a round headed element within the periphery of said discharge opening closure adapted to engage the outer face of the conduit closure element to provide a universal bearing for one of these closures with respect to the other.

18. A device of the character described, including, in combination, a flushing valve element having a vent opening, a conduit in said element terminating in an outlet directed toward said vent opening, a pivotally-supported conduit closure, a pivotally-supported vent closure, common pivot means from which both said conduit closure and said vent closure are pivotally supported and on which said closures may rotate jointly and severally, and gravity-actuated means tending to swing said vent closure out of operative or closing position, and said conduit closure into operative or closing position.

19. A device of the character described, including, in combination, a cylindrical element having a vent opening characterized by having its edge terminate on a planular surface within said element extending substantially parallel to the axis of said element, a removable conduit arranged within said element, said conduit having a portion of reduced cross section, said reduced portion having flattened sides and terminating in an outlet having its edge on a planular surface within said element extending at an angle with said axis, said outlet facing said vent opening, being spaced therefrom and lying substantially on a level therewith, a vent closure and a conduit closure movable in the space between said vent opening and said conduit outlet and freely rotatable about a common axis of rotation arranged above the space between said vent opening and said outlet, said axis being so positioned that in one position of rotation said conduit closure will seat on said conduit outlet edge while said vent closure is unseated and in another position of rotation said vent closure will seat on said vent edge while said conduit closure is unseated, pivot means for providing said common axis of rotation, and a weight supported by one of said closures to maintain normally the first of said named positions of rotation of said closures, said closures being displaceable about said common axis of rotation to effect the second of said named positions of rotation by the forces of the outward passage of fluid from said outlet acting on said conduit closure whereby said vent closure seals said vent opening until said fluid passage substantially ceases.

20. A device of the character described, including, in combination, a cylindrical flushing valve element having a vent opening, characterized by having its edge terminate on a planular surface within said element extending substantially parallel to to the axis of said element, a removable conduit in said element, said conduit having a portion of reduced cross section, said reduced portion terminating in an outlet oblique to said element axis facing the said vent opening and lying substantially on a level therewith, a conduit closure and a vent closure rotatable freely about a common axis of rotation so arranged that in one position of rotation said conduit closure will seat on said outlet, and in another position of rotation said vent closure will seat on said vent edge, pivot means mounted on said removable conduit for providing said common axis of rotation, and a weight mounted on one of said closures to maintain normally the first of said named positions of rotation, said closures being displaceable about said common axis to effect the second of said positions of rotation by the forces of the outward passage of fluid from said conduit outlet whereby said vent closure will seal said vent opening.

21. A device of the character described, including, in combination, a flushing valve element having a vent opening, a removable conduit in said element, said conduit having a portion of reduced cross section, said reduced cross section terminating in an outlet oblique to the element axis and facing said vent opening, a conduit closure, a vent closure, pivot means mounted on said removable conduit and slot means in association with said closures and conduit for pivotally supporting said closures with respect to said vent opening and outlet, and a weight mounted on one of said closures tending to move said vent closure out of operative or closing position and said conduit closure into operative or closing position, said two closure members being movable as a unit about said pivot means.

22. A device of the character described, including, in combination, a flushing valve construction having a vent opening, a conduit in said construction terminating in an outlet directed toward said vent opening, a pivotally supported conduit closure, a vent closure pivotally supported independently of said conduit closure, common pivot means for pivotally supporting both said closures independently, said vent closure being mounted to swing under gravity out of vent closing position, and gravity actuated means tending to swing said conduit closure into closing position.

23. A device of the character described, including, in combination, a flushing valve construction having a vent opening, a conduit in said valve terminating in an outlet, a conduit closure, a vent closure, separate extensions for each of said closures, said extensions each having a slot, a pivot pin supported by said conduit and passing through all of said slots, said vent closure being mounted to swing under gravity out of vent closing position, and gravity actuated means tending to swing said conduit closure into closing position.

24. A device of the character described, including, in combination, a flushing valve element having a vent opening, a conduit in said element terminating in an outlet directed toward said vent opening, a pivotally-supported conduit closure, a pivotally supported vent closure, common pivot means from which both said conduit closure and said vent closure are pivotally supported and on which said closures may rotate jointly and severally, said vent closure being mounted to swing under gravity out of vent closing position, and gravity actuated means tending to swing said conduit closure into closing position.

GREGORY BROWN.